(12) United States Patent
Liu et al.

(10) Patent No.: US 8,833,720 B2
(45) Date of Patent: Sep. 16, 2014

(54) MODULAR SUPPORT DEVICE

(75) Inventors: Chia-Hsin Liu, New Taipei (TW);
Ming-Hui Kao, New Taipei (TW)

(73) Assignee: Wistron Corporation, New Taipei (TW)

( * ) Notice: Subject to any disclaimer, the term of this patent is extended or adjusted under 35 U.S.C. 154(b) by 257 days.

(21) Appl. No.: 13/422,752

(22) Filed: Mar. 16, 2012

(65) Prior Publication Data
US 2012/0205334 A1 Aug. 16, 2012

Related U.S. Application Data

(63) Continuation-in-part of application No. 12/194,301, filed on Aug. 19, 2008, now abandoned.

(30) Foreign Application Priority Data

Apr. 2, 2008 (TW) .............................. 97205635 U

(51) Int. Cl.
| | |
|---|---|
| A47B 91/00 | (2006.01) |
| G06F 1/18 | (2006.01) |
| A47B 57/58 | (2006.01) |
| A47B 45/00 | (2006.01) |

(52) U.S. Cl.
CPC ............. *A47B 45/00* (2013.01); *G06F 1/181*
(2013.01); *A47B 57/583* (2013.01)
USPC .................................................. 248/346.07

(58) Field of Classification Search
CPC ....... F16M 11/00; F16M 11/22; F16M 13/00;
F16M 2200/08; G06F 1/181; G06F 1/16;
A47B 65/00; A47B 91/005; A47B 45/00;
A47B 57/583; H05K 5/0204; H05K 5/0234;
B62H 5/14; B25B 1/02; B25B 5/02
USPC ................. 248/149, 676, 678, 346.01, 346.3,
248/346.07, 292.12, 354.7, 670, 448, 460,
248/346.03, 127, 150, 152, 174;
211/42–43, 40, 184; 269/43, 143, 249;
312/348.3; 108/60–61; 410/94, 121

See application file for complete search history.

(56) References Cited

U.S. PATENT DOCUMENTS

| | | | | | |
|---|---|---|---|---|---|
| 4,856,658 | A | * | 8/1989 | Novak | 211/26.1 |
| 5,192,046 | A | * | 3/1993 | Howard | 248/676 |
| 5,263,668 | A | * | 11/1993 | Reiter | 248/346.01 |
| 5,295,648 | A | * | 3/1994 | Hames | 248/149 |
| 6,065,611 | A | * | 5/2000 | Huang | 211/26 |
| 6,364,278 | B1 | * | 4/2002 | Lin et al. | 248/676 |
| 6,805,327 | B1 | * | 10/2004 | Shen | 248/346.07 |
| 6,923,414 | B2 | * | 8/2005 | Shida et al. | 248/346.07 |
| 7,448,587 | B2 | * | 11/2008 | Han | 248/346.07 |
| 7,566,043 | B2 | * | 7/2009 | Chen | 248/616 |

* cited by examiner

*Primary Examiner* — Terrell McKinnon
*Assistant Examiner* — Ingrid M Weinhold
(74) *Attorney, Agent, or Firm* — Overhauser Law Offices, LLC

(57) ABSTRACT

A modular support device includes a plurality of interconnected inner bases each having an upstanding plate member, first and second slidable connecting members extending respectively on two opposite sides of the upstanding plate member, and two first support members each disposed between one of the first and second slidable connecting members and the upstanding plate member. The first slidable connecting member of one of the inner bases is slidably connectible to the second slidable connecting member of the other inner base to adjust a distance between the upstanding plate members. The first support members of each adjacent pair of the inner bases cooperate with each other for supporting an article thereon. The upstanding plate members of each adjacent pair of the inner bases cooperate with each other to sandwich therebetween the article.

19 Claims, 17 Drawing Sheets

MODULAR SUPPORT DEVICE

CROSS-REFERENCE TO RELATED APPLICATION

This application is a continuation-in-part of U.S. patent application Ser. No. 12/194,301, filed by the applicant on Aug. 19, 2008, the entire disclosure of which is incorporated herein by reference.

BACKGROUND OF THE INVENTION

1. Field of the Invention

The disclosure relates to a modular support device, more particularly to a modular support device with an expansion mechanism for supporting different numbers of articles.

2. Description of the Related Art

Referring to FIGS. 1 and 2, a conventional support device 100 includes two outer bases 1 that are interconnected movably. Each of the outer bases 1 includes a base body 11, and a first slidable connecting member 12 and a second slidable connecting member 13 that extend transversely and respectively from an inner side of the base body 11 and that are spaced apart from each other. The first slidable connecting member 12 has two spaced-apart resilient arms 122 disposed on a top wall 121 thereof. Each of the resilient arms 122 has a first arm portion 123, a second arm portion 124, and a plurality of positioning teeth 125. The first arm portion 123 has one end connected to the top wall 121. The second arm portion 124 is connected to the other end of the first arm portion 123 and is adapted to be manipulated. The positioning teeth 125 are provided on and project from a top face of the first arm portion 123. The second slidable connecting member 13 has a plurality of positioning grooves 132, and a plurality of flanged portions 133 disposed proximate to a bottom end thereof. The positioning grooves 132 are formed in an inner wall surface of a top wall 131.

During assembly of the two outer bases 1, the first slidable connecting member 12 of the left outer base 1 is extended into the second slidable connecting member 13 of the right outer base 1, and the first slidable connecting member 12 of the right outer base 1 is extended into the second slidable connecting member 13 of the left outer base 1, so that the positioning teeth 125 of the resilient arm 122 of the first slidable connecting member 12 of each of the outer bases 1 engage the positioning grooves 132 in the second slidable connecting member 13 of the other of the outer bases 1, and the flanged portions 133 of the second slidable connecting member 13 of each of the outer bases 1 abut against a bottom end of the first slidable connecting member 12 of the other of the outer bases 1, thereby completing assembly of the two outer bases 1. When the support device 100 is in use, the base bodies 11 of the two outer bases 1 are pushed toward each other so as to shorten a distance between the two base bodies 11. Alternatively, the second arm portions 124 of the resilient arms 122 are manipulated respectively, so that the positioning teeth 125 of the resilient arms 122 respectively disengage from the positioning grooves 132 to permit outward pulling of the base bodies 11 of the two outer bases 1 in opposite directions, thereby lengthening the distance between the two base bodies 11.

With further reference to FIGS. 3 and 4, a computer device 300 may be supported on a planar surface (not shown) using two support devices 100 that are arranged one in front of the other, with supporting portions 111 of the base bodies 11 supporting a bottom surface of the computer device 300, and with the computer device 300 sandwiched between limiting portions 112 of the base bodies 11 that flank left and right sides of the computer device 300. Thus, the support devices 100 are able to support the computer device 300 stably on the planar surface. However, if a plurality of computer devices 300 are arranged in juxtaposition and are supported by a plurality of the support devices 100 on a planar surface, a lot of space will be taken up. Moreover, a combined width (H) of the computer devices 300 and the support devices 100 will increase with the number of the computer devices 300 supported. In addition, in order to support one computer device 300, two support devices 100 (i.e., four outer bases 1) need to be used. Since the support device 100 is not provided with any expansion mechanism, the more the number of computer devices 300 to be supported, the more will be the number of outer bases 1 that are needed, thereby resulting in problems of increased manufacturing cost of the support devices 100, higher transport cost, and more inventory space.

Taiwanese Utility Model No. M315001 (Application No. 95222640) discloses a modular support device, which likewise does not have any expansion mechanism, and which will also entail such problems of increased manufacturing and transport costs, as well as considerable inventory space.

SUMMARY OF THE INVENTION

Therefore, an object of the disclosure is to provide a modular support device having an expansion mechanism.

Another object of the disclosure is to provide a modular support device that does not occupy much space in use, and that permits a reduction in manufacturing cost.

The objects of the disclosure and the solutions to the technical problems may be realized using the following technical means.

According to one aspect of this disclosure, a modular support device adapted to support a plurality of articles comprises a plurality of interconnected inner bases. Each of the inner bases includes an upstanding plate member, first and second slidable connecting members extending transversely and respectively in opposite directions on two opposite sides of the upstanding plate member, and two first support members that are disposed on two opposite sides of the upstanding plate member and that have support faces at a level higher than that of the first and second slidable connecting members. Each of the first support members is disposed between the upstanding plate member and one of the first and second slidable connecting members. The first slidable connecting member of one of the inner bases in each adjacent pair of the inner bases is connectible to the second slidable connecting member of the other of the inner bases in the respective adjacent pair of the inner bases. The first and second slidable connecting members of the inner bases in each adjacent pair are slidable relative to each other to adjust a distance between the upstanding plate members of the inner bases. Each of the first support members of one of the inner bases cooperates with one of the first support members of the other of the inner bases for supporting one of the articles on the support faces thereof. The upstanding plate member of one of the inner bases in each adjacent pair of the inner bases cooperates with the upstanding plate member of the other of the inner bases in the respective adjacent pair of the inner bases to sandwich therebetween one of the articles.

The objects of the disclosure and the solutions to the technical problems can be further realized using the following technical means.

According to another aspect of this disclosure, a modular support device adapted to support an article comprises two spaced-apart outer bases and an inner base disposed between the outer bases. Each of the outer bases includes an upstanding limiting member, and a slidable connecting member extending transversely from the upstanding limiting member. The inner base includes an upstanding plate member having two opposite sides respectively facing the outer bases, a hollow base portion that surrounds a lower part of the upstanding plate member, and first and second slidable connecting members extending respectively in opposite directions from the hollow base portion. The hollow base portion includes two opposite first walls respectively facing and spaced apart from the opposite sides of the upstanding plate member, two opposite second walls interconnecting the first walls, two connecting webs respectively connecting the second walls to the lower part of the upstanding plate member, and two first support members each of which is connected to one of the opposite sides of the upstanding plate member and one of the first walls and has a support face that faces upwardly and that is disposed at a level higher than that the first and second slidable connecting members. The slidable connecting member of each of the outer bases is slidably connectible with one of the first and second slidable connecting members of the inner base to adjust a distance between the upstanding limiting member of each of the outer bases and the upstanding plate member of the inner base. The upstanding limiting member of each of the outer bases cooperates with the upstanding plate member of the inner base for sandwiching the article therebetween. Each of the outer bases further includes a second support member that is disposed between the upstanding limiting member and the slidable connecting member of a respective one of the outer bases and that has a support face at a level higher than that of the slidable connecting member of the respective one of the outer bases. The second support member of each of the outer bases cooperates with one of the first support members of the inner base for supporting the article on the support faces.

In the modular support device according to the disclosure, the arrangement of the base provides an expansion mechanism. The number of the bases of the modular support device can be varied with the number of the articles to be supported, without requiring additional outer bases. Thus, the combined space and width occupied by the modular support device and the articles in use, as well as the manufacturing cost, can be reduced.

BRIEF DESCRIPTION OF THE DRAWINGS

Other features and advantages of the disclosure will become apparent in the following detailed description of the embodiments with reference to the accompanying drawings, of which.

DETAILED DESCRIPTION OF THE PREFERRED EMBODIMENTS

Figure 1:
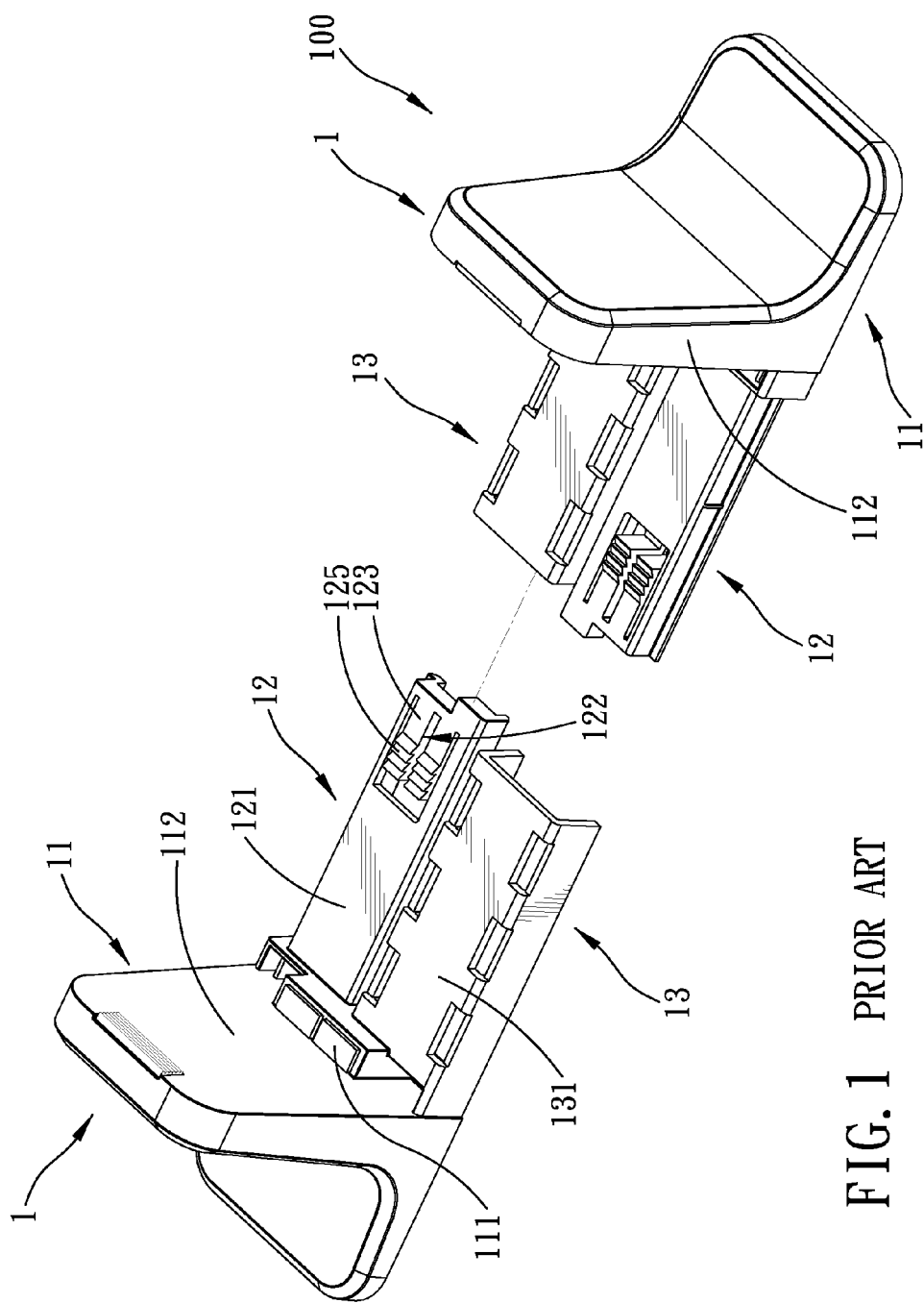
FIG. 1 is an exploded perspective view of a conventional support device.
Figure 2:
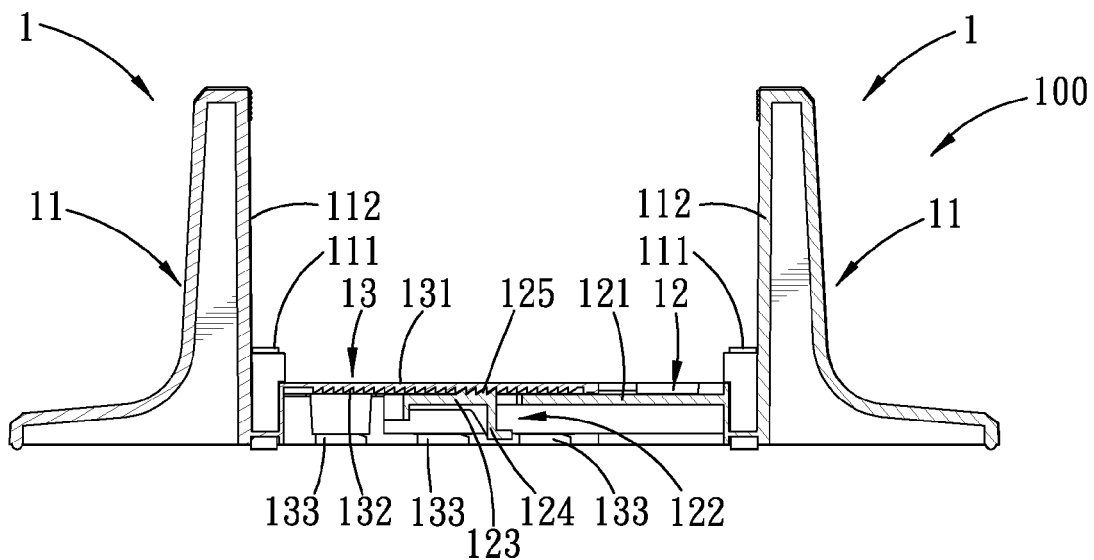
FIG. 2 is a sectional view of the conventional support device.
Figure 3:
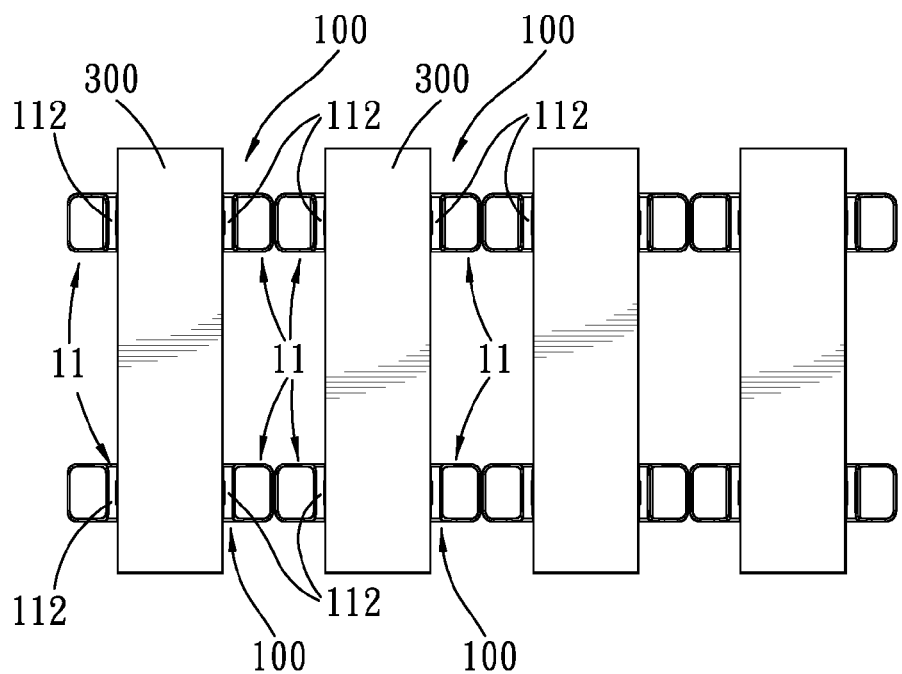
FIG. 3 is a schematic top view of a plurality of the conventional support devices supporting a plurality of computer devices.

The above-mentioned and other technical contents, features, and effects of this disclosure will be clearly presented from the following detailed description of three embodiments in coordination with the reference drawings. Through the description of the embodiments, the technical means employed by the disclosure to achieve the intended objects, and the advantageous effects contemplated thereby, can be better understood and appreciated. It is noted that the accompanying drawings are for illustration and reference only, and are not intended to limit the scope of the disclosure.

Before the disclosure is described in greater detail, it should be noted that like elements are denoted by the same reference numerals throughout the disclosure.

Figure 8:
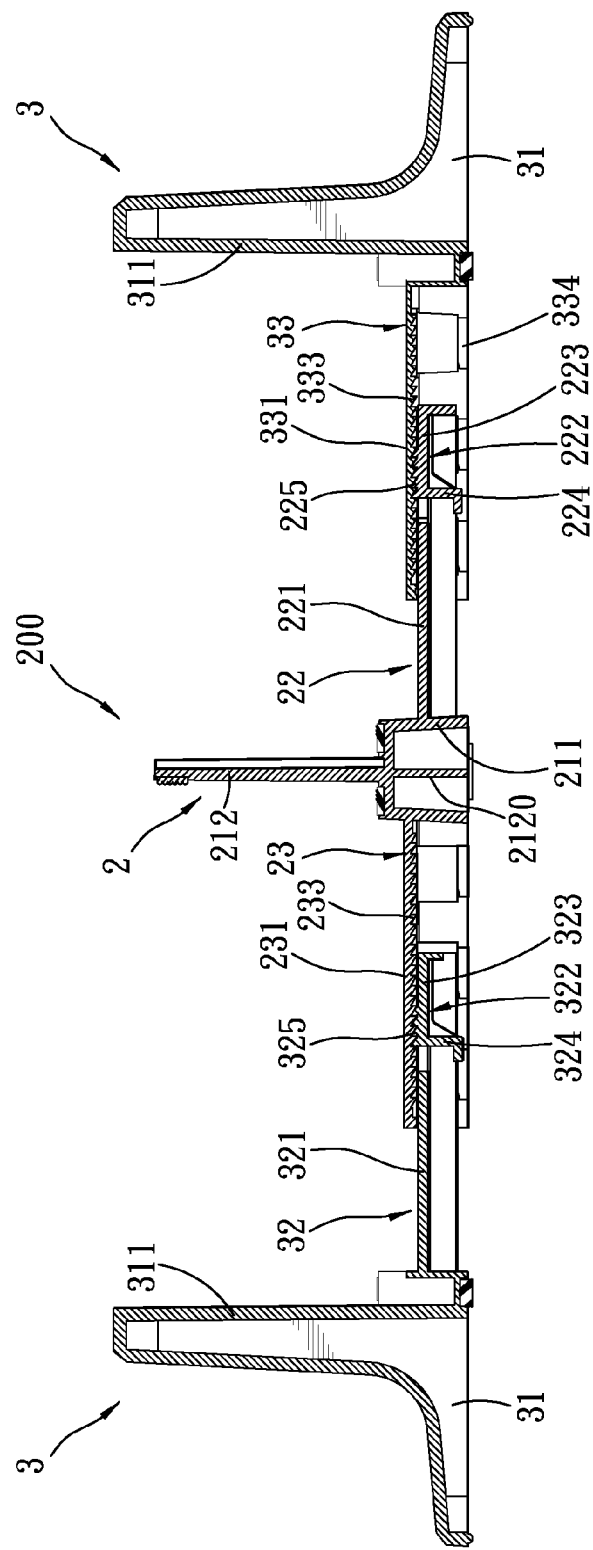
FIG. 8 is a sectional view of the first embodiment taken along line 8-8 of FIG. 5 to illustrate how positioning teeth of a first slidable connecting member of a base engage positioning grooves in a second slidable connecting member of an outer base, and how positioning teeth of a first slidable connecting member of another outer base engage positioning grooves in a second slidable connecting member of the base.
Figure 9:
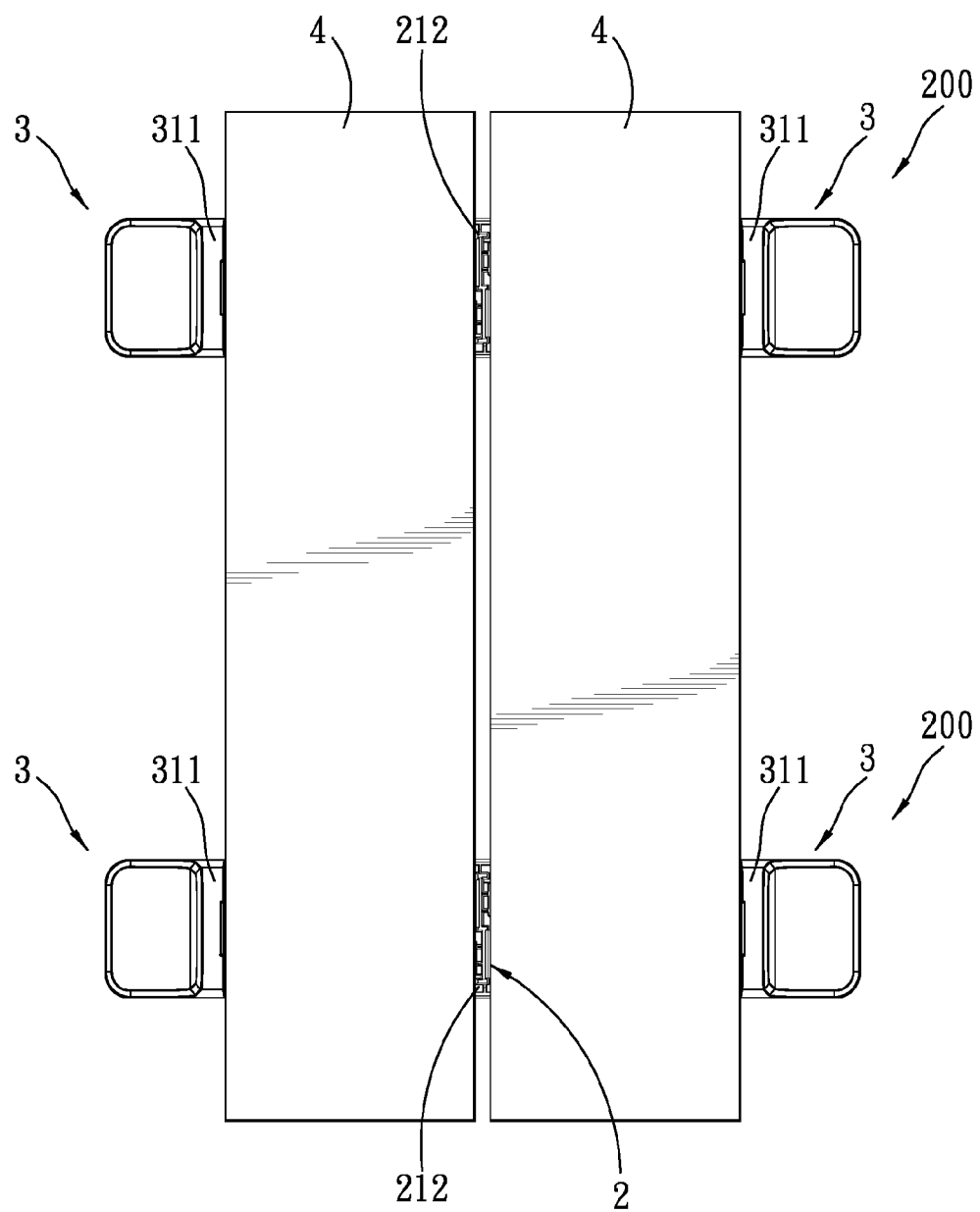
FIG. 9 is a schematic top view of the first embodiment when used to support a plurality of articles.

Referring to FIGS. 5 to 10, a modular support device 200 according to the first embodiment of the disclosure is adapted for supporting a plurality of articles 4 (see FIG. 9). The articles 4 may be electronic devices, such as computer devices or servers. The modular support device 200 includes an inner base 2 and two spaced-apart outer bases 3.

The inner base 2 is disposed between the outer bases 3, and includes a hollow base portion 211, an upstanding plate member 212 having two opposite sides respectively facing the outer bases 3, two first slidable connecting members 22, and two second slidable connecting members 23. A lower part 2120 (see FIG. 8) of the upstanding plate member 212 is surrounded by the hollow base portion 211. Each side of the upstanding plate member 212 has a ribbed section 2121 and a non-ribbed section 2122. The ribbed section 2121 includes a plurality of spaced-apart ribs 2123 projecting transversely therefrom.

The hollow base portion 211 includes two opposite first walls 201 respectively facing the opposite sides of the upstanding plate member 212, two opposite second walls 202 interconnecting the first walls 201, two connecting webs 204 respectively connecting the second walls 202 to the lower part 2120 of the upstanding plate member 212, and two first support members 207. One of the first slidable connecting members 22 and one of the second slidable connecting members 23 are disposed side by side and extend transversely from one of the first walls 201. The other first slidable connecting member 22 and the other second slidable connecting member 23 are disposed side by side and extend transversely from the other one of the first walls 201. Said one of the first slidable connecting members 22 and the other second slidable connecting member 23 are arranged along a straight line. The other first slidable connecting member 22 and said one of the second slidable connecting members 23 are arranged along another straight line.

Each of the first support members 207 is connected to one of the opposite sides of the upstanding plate member 212 and one of the first walls 201, and has two spaced-apart support faces 213 that face upwardly and that are disposed at a level higher than that of the first and second slidable connecting members 22, 23.

Each of the first slidable connecting members 22 has a top wall 221 and two resilient arms 222 provided on the top wall 221. Each of the resilient arms 222 includes a connecting portion 223, a press portion 224, and a plurality of positioning teeth 225. The connecting portion 223 has one end connected to the top wall 221. The positioning teeth 225 extend transversely and project from a top face of the connecting portion 223. The press portion 224 is generally L-shaped, and extends downwardly from the other end of the connecting portion 223. The press portion 224 is adapted to be manipulated so as to bring the connecting portion 223 and the positioning teeth 225 to displace downwardly. Each of the second slidable connecting members 23 has a top plate 231, two side plates 232 extending respectively and downwardly from two opposite sides of the top plate 231, a plurality of positioning grooves 233, and a plurality of flanged portions 234. The positioning grooves 233 are formed in an inner surface of the top plate 231 in two rows and extend transversely. The flanged portions 234 are formed at bottom ends of the side plates 232.

Each of the outer bases 3 includes a base body 31, an upstanding limiting member 311 extending upwardly from the base body 31, two slidable connecting members 32, 33 disposed side by side and extending transversely from one side of the upstanding limiting member 311, and a second support member 313 that is disposed between the upstanding limiting member 311 and the slidable connecting members 32, 33 and that has two support faces 312 at a level higher than that of the slidable connecting members 32, 33. The second support member 313 of each outer base 3 cooperates with one of the first support members 207 of the inner base 2 for supporting the article 4 on the support faces 213, 312 thereof. The slidable connecting member 32 of each outer base 3 is identical to the first slidable connecting members 22 of the inner base 2 in structure, and is slidably connectible with the corresponding second slidable connecting member 23 of the inner base 2. The flanged portions 234 of each second slidable connecting member 23 abut against a bottom end of the slidable connecting member 32 of a respective outer base 3 so as to prevent downward disengagement of the slidable connecting member 32 from the second slidable connecting member 23. The slidable connecting member 32 has a top wall 321 and two resilient arms 322 provided on the top wall 321. Each resilient arm 322 includes a connecting portion 323 having one end connected to the top wall 321, a press portion 324 formed at the other end of the connecting portion 323, and a plurality of positioning teeth 325 provided on a top face of the connecting portion 323. The positioning teeth 325 of the resilient arms 322 of the slidable connecting member 32 are engageable with the positioning grooves 233 in the corresponding second slidable connecting member 23 at a selected position to thereby limit sliding movement of the slidable connecting member 32 relative to the second slidable connecting member 23.

The slidable connecting member 33 of each outer base 3 is identical to the second slidable connecting members 23 of the inner base 2 in structure, and is slidably connectible with the corresponding first slidable connecting member 22 of the inner base 2. The slidable connecting member 33 has a top plate 331, two side plates 332 extending respectively downward from two opposite sides of the top plate 331, a plurality of positioning grooves 333, and a plurality of flanged portions 334. The positioning grooves 333 are formed in an inner surface of the top plate 331 in two rows and extend transversely. The flanged portions 334 of the slidable connecting member 33 are formed at bottom ends of the side plates 332, and abut against a bottom end of the corresponding first slidable connecting member 22 so as to prevent downward disengagement of the first slidable connecting member 22 from the slidable connecting member 33. The positioning teeth 225 of the resilient arms 222 of each first slidable connecting member 22 are engageable with the positioning grooves 333 in the corresponding slidable connecting member 33 at a selected position to thereby limit sliding movement of the slidable connecting member 33 relative to the first slidable connecting member 22.

Figure 5:
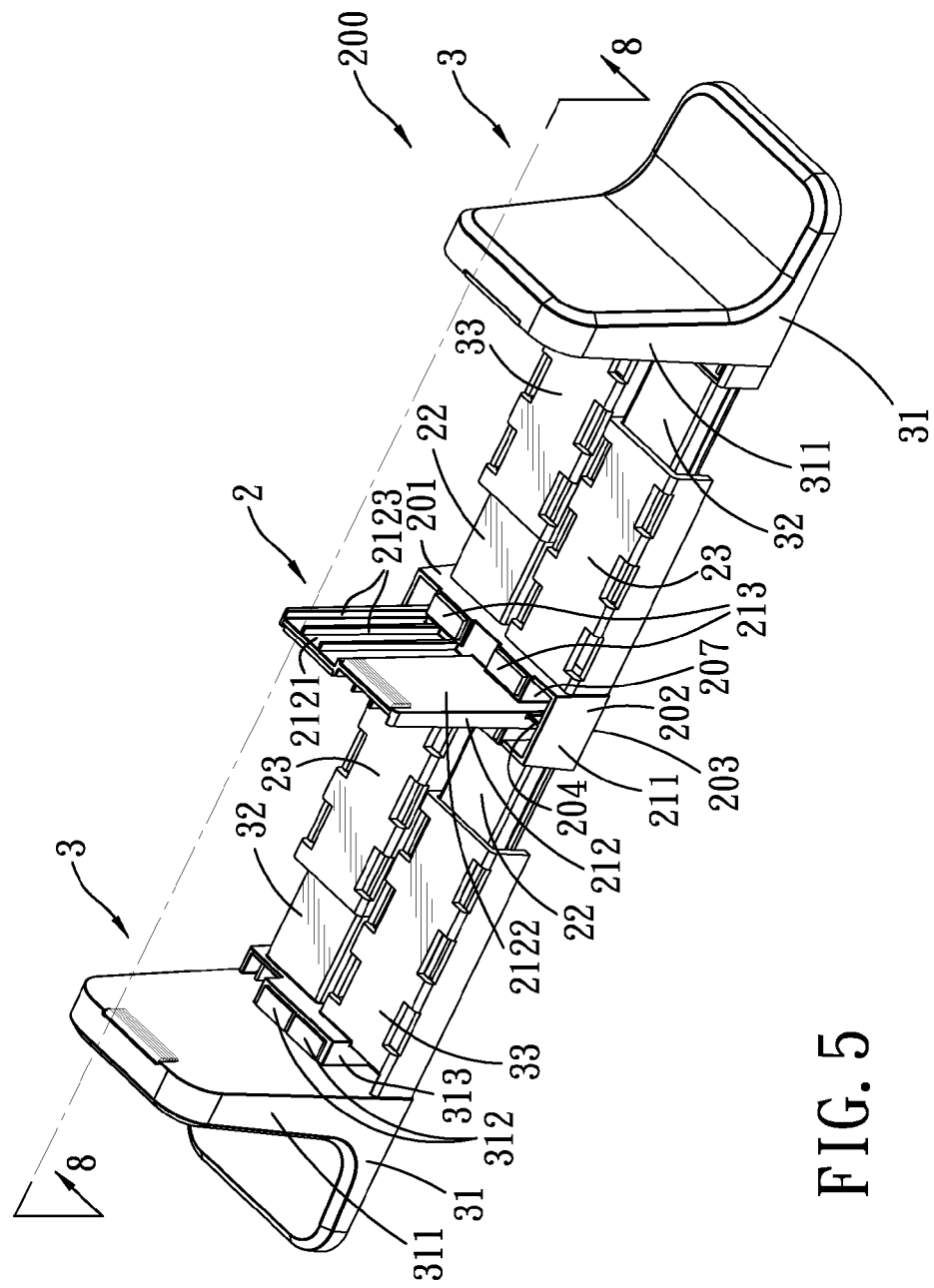
FIG. 5 is a perspective view of the first embodiment of a modular support device according to the disclosure.
Figure 6:
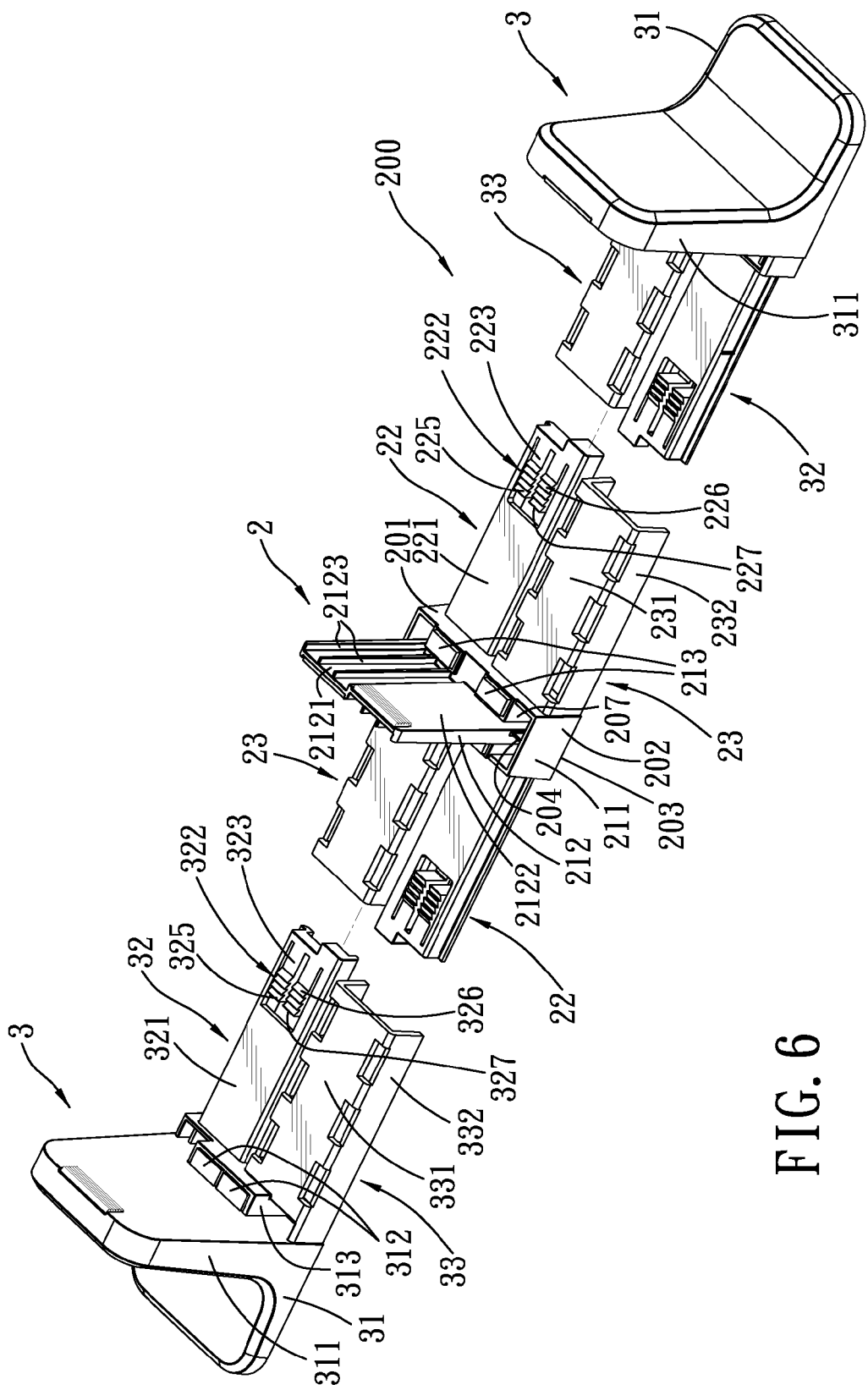
FIG. 6 is an exploded perspective view of the first embodiment.
Figure 7:
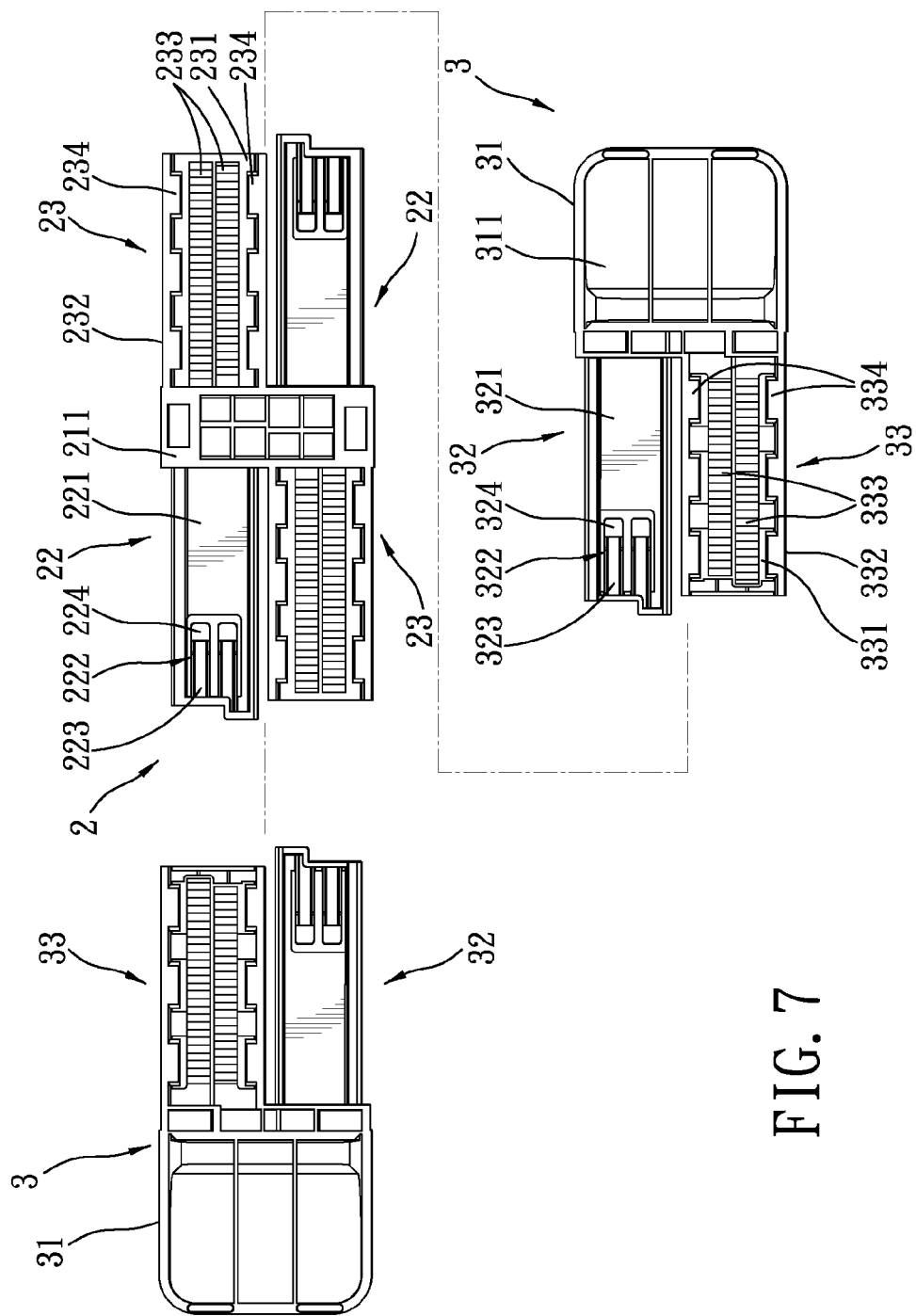
FIG. 7 is an exploded schematic bottom view of the first embodiment.

As shown in FIGS. 5, 6 and 8, when assembling the modular support device 200 of the disclosure, the slidable connecting member 32 of one of the outer bases 3 is extended into the second slidable connecting member 23 on a left side of the inner base 2, and the slidable connecting member 33 of said one of the outer bases 3 is sleeved onto the first slidable connecting member 22 on the left side of the inner base 2. Subsequently, the slidable connecting member 32 of the other outer base 3 is extended into the second slidable connecting member 23 on a right side of the inner base 2, and the slidable connecting member 33 of said other outer base 3 is sleeved onto the first slidable connecting member 22 on the right side of the inner base 2, so that the positioning teeth 325 on the slidable connecting member 32 of each of the outer bases 3 engage the positioning grooves 233 in the corresponding second slidable connecting member 23 of the inner base 2, and so that the positioning teeth 225 of each of the first slidable connecting members 22 of the inner base 2 engage the positioning grooves 333 in the slidable connecting member 33 of the corresponding outer base 3. Thus, assembly of the modular support device 200 is completed.

Since each of the positioning teeth 225, 325 has an oblique face 226, 326, during the process of pushing the outer bases 3 to the left and right sides of the inner base 2, the positioning teeth 225, 325 will displace downward under the pushing forces, so that the slidable connecting members 32, 33 of each outer base are respectively slidable relative to the corresponding second and first slidable connecting members 23, 22. After the slidable connecting members 32, 33 of each outer base 3 are respectively slid to target positions, due to the resilient action of the resilient arms 322, 222, the positioning teeth 325, 225 will respectively engage the positioning grooves 233, 333 at the target positions, thereby locking the outer bases 3 to the left and right sides of the inner base 2. Thus, the distance between the upstanding limiting member 311 of each outer base 3 and the upstanding plate member 212 of the inner base 2 can be shortened. In addition, by manipulating the press portions 224, 324 of the resilient arms 222, 322 of the slidable connecting members 22, 32 simultaneously to bring the positioning teeth 225, 325 of the resilient arms 222, 322 of the slidable connecting members 22, 32 to disengage from the positioning grooves 333, 233 in the slidable connecting members 33, 23, respectively, the outer bases 3 can be pulled outward so that the outer bases 3 are moved away from the inner base 2. After the slidable connecting members 32, 33 are slid to target positions, due to the resilient action of the resilient arms 322, 222, the positioning teeth 325, 225 will respectively engage the positioning grooves 233, 333 at the target positions, thereby locking the outer bases 3 to the left and right sides of the inner base 2. Thus, the distance between the upstanding limiting member 311 of each outer base 3 and the upstanding plate member 212 of the inner base 2 can be lengthened. Furthermore, since each of the positioning teeth 225, 325 is configured to have an upright face 227, 327 connected to the oblique face 226, 326 thereof, when the press portions 224, 324 of the resilient arms 222, 322 are not manipulated, the outer bases 3 can be prevented from being pulled away from the inner base 2 and from being separated therefrom.

Figure 10:
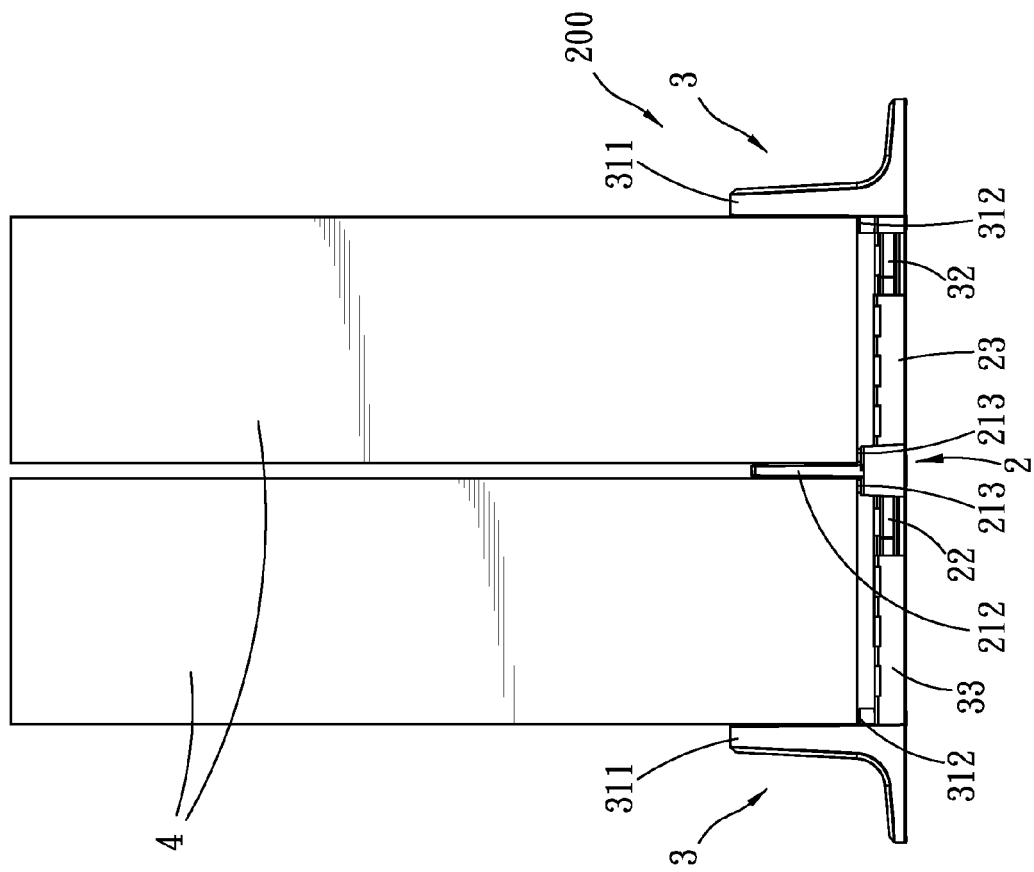
FIG. 10 is a schematic front view of FIG. 9.

With reference to FIGS. 9 and 10, in this embodiment, two modular support devices 200 are arranged one in front of the other to support two articles 4 on a planar surface. Since the slidable connecting members 32, 33 of each of the outer bases 3 are respectively slidable to the corresponding second and first slidable connecting members 23, 22 of the inner base 2, the distance between the upstanding limiting member 311 of each outer base 3 and the upstanding plate member 212 of the inner base 2 may be variedly adjusted depending on the width of the article 4 to be supported. Further, the support faces 213 of the first support member 207 on each side of the upstanding plate member 212 of the inner base 2 and the support faces 312 of the second support member 313 of the corresponding outer base 3 can support a bottom side of a corresponding one of the articles 4, and the upstanding plate member 212 of the inner base 2 and the upstanding limiting member 311 of the corresponding outer base 3 flank opposite left and right sides of the corresponding article 4 to thereby sandwich therebetween the corresponding article 4. Moreover, through the presence of the ribs 2123 on the two opposite sides of the upstanding plate member 212, the articles 4 can be stably supported on the modular support devices 200 of the disclosure.

Because of the configuration of the inner base 2 of the modular support device 200, use of the two modular support devices 200 (i.e., four outer bases 3) can simultaneously support two articles 4 in this embodiment. When it is desired to support more than two articles 4, it is merely necessary to increase the number of the inner bases 2 of the modular support devices 200. It is not necessary to increase the number of the outer bases 3 with the number of the articles 4 to be supported. Thus, the combined space and width occupied by the modular support device 200 and the articles 4 in use can be reduced. Moreover, the overall manufacturing cost of the modular support device 200, the inventory space required by the outer bases 3, as well as the transport cost of the outer bases 3, can be reduced.

Figure 11:
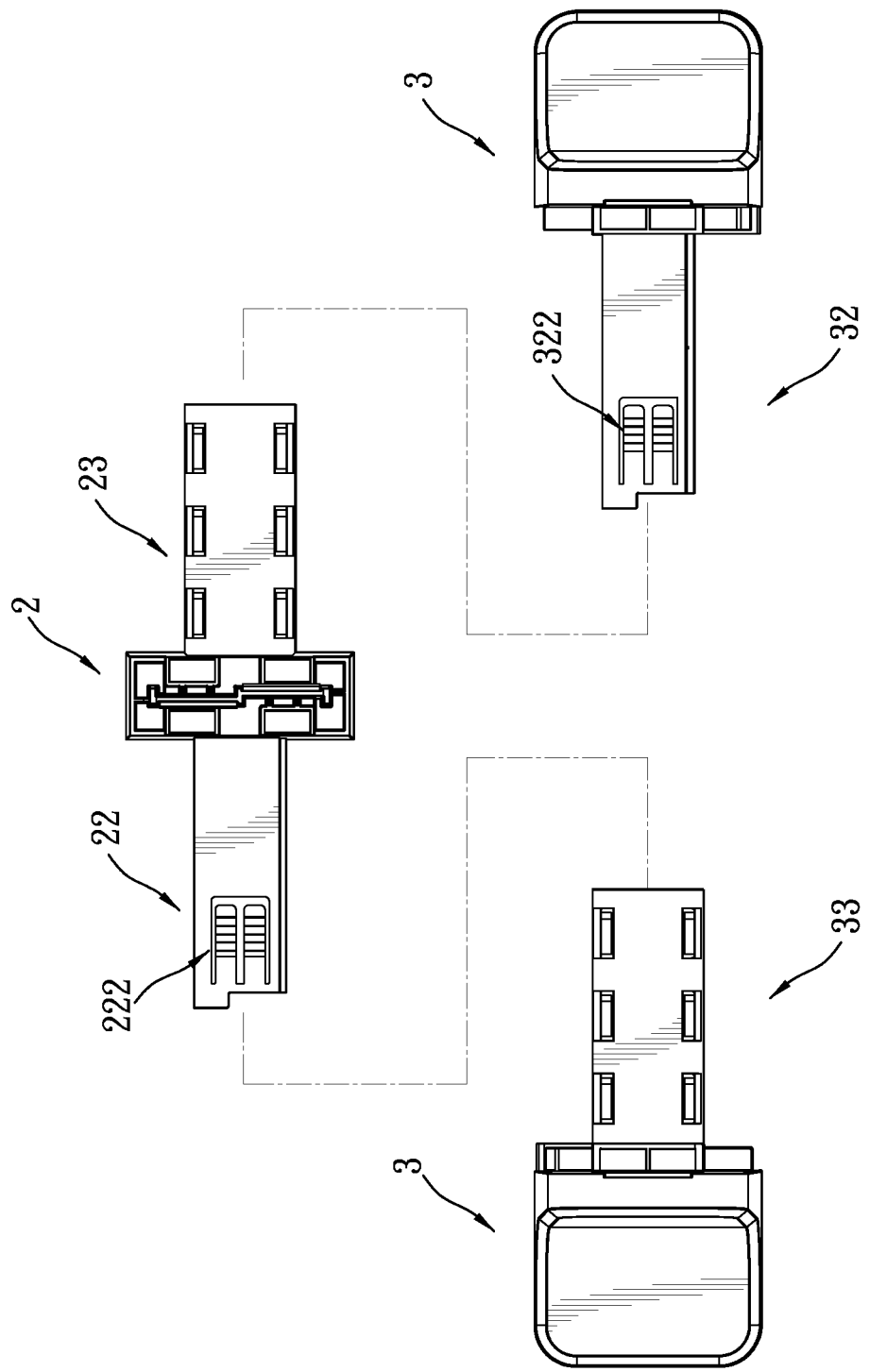
FIG. 11 is an exploded schematic top view of a modified form of the first embodiment.
Figure 12:
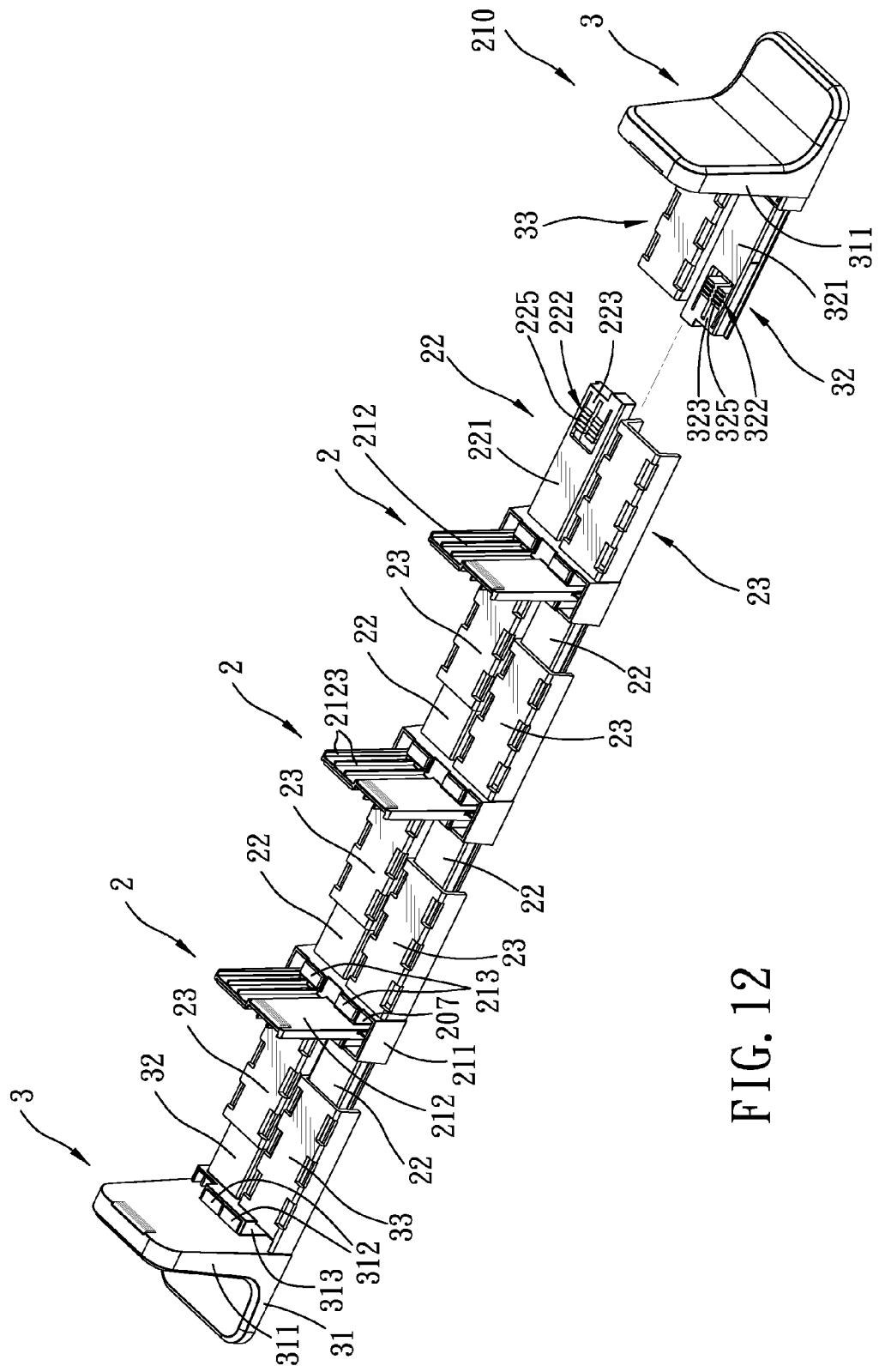
FIG. 12 is a partly exploded perspective view of the second embodiment of a modular support device according to the disclosure.
Figure 13:
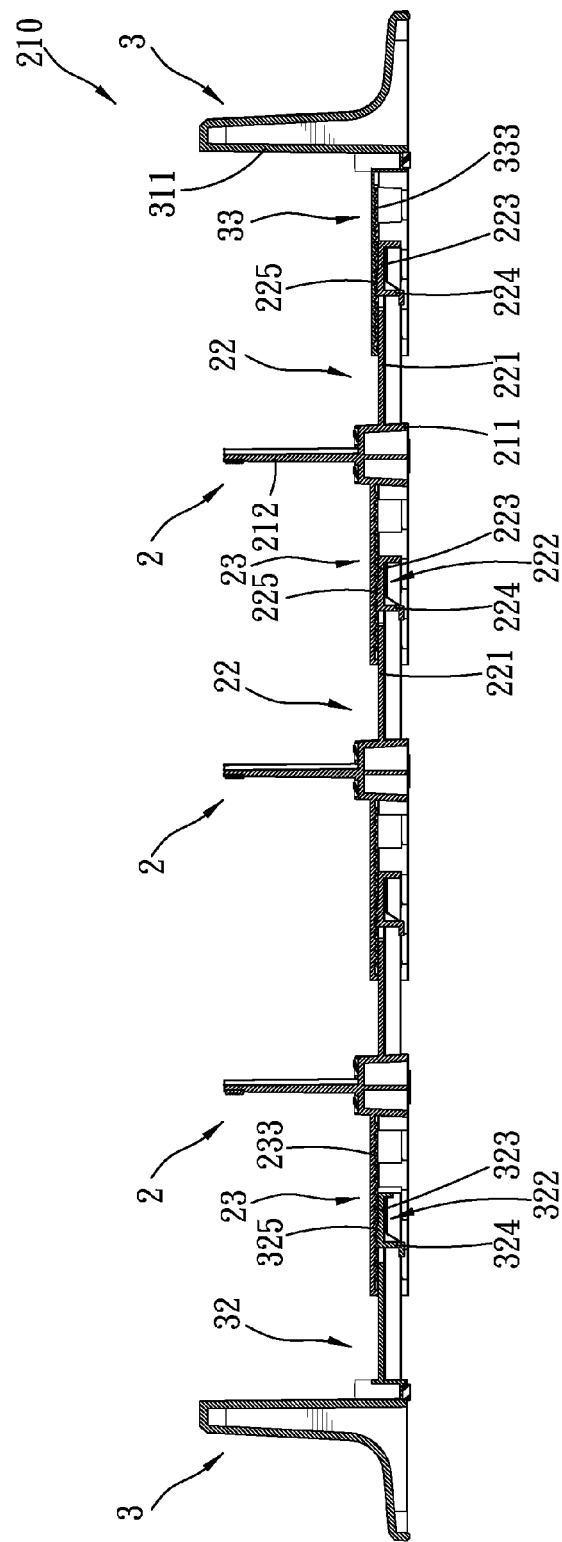
FIG. 13 is a sectional view of the second embodiment.

Referring to FIG. 11, it should be noted that, in this embodiment, the inner base 2 may have one first slidable connecting member 22 and one second slidable connecting member 23. In this case, one of the outer bases 3 is provided with only one slidable connecting member 32 for coupling with the second slidable connecting member 23 of the inner base 2, and the other outer base 3 is provided with only one slidable connecting member 33 for coupling with the first slidable connecting member 22 of the inner base 2. The outer bases 3 are slidably connectible with the inner base 2 in the same manner. However, the provision of two first slidable connecting members 22 and two second slidable connecting members 23 on the inner base 2 and the provision of the slidable connecting members 32, 33 on each of the outer bases 3 ensure better connection between each of the outer bases 3 and the inner base 2, and prevent rotation of the outer bases 3 relative to the inner base 2 due to external forces.

Referring to FIGS. 12 to 15, a modular support device 210 according to the second embodiment of this disclosure is shown to be similar to the first embodiment. The difference between the first and second embodiments resides in that the modular support device 210 includes a plurality of inner bases 2 that are detachably interconnected. The two outer bases 3 are respectively connected to the two inner bases 2 that are at two opposite distal ends of the interconnected inner bases 2.

In each adjacent pair of the inner bases 2, the first and second slidable connecting members 22, 23 of one of the inner bases 2 are slidably and respectively connected to the second and first slidable connecting members 23, 22 of the other of the inner bases 2 such that each adjacent pair of the inner bases 2 are slidable relative to each other along the first and second slidable connecting members 22, 23 to adjust the distance between the upstanding plate members 212 of the inner bases 2. Each outer base 3 is similarly slidable by means of the slidable connecting members 32, 22 and the slidable connecting members 33, 23 so as to adjust the distance between the upstanding limiting member 311 and upstanding plate member 212 of the inner base 2 connected thereto. Thus, the articles 4 can be supported on the support faces 213 of the first support members 207 of each adjacent pair of the inner bases 2, and on the support faces 312 of the second support member 313 of each outer base 3 together with the support faces 213 of the first support member 213 of the inner base 2 adjacent thereto. Moreover, the articles 4 can be sandwiched between the upstanding plate members 212 of each adjacent pair of the inner bases 2, and between the upstanding limiting member 311 of each outer base 3 and the upstanding plate member 212 of the inner base 2 adjacent thereto.

Figure 4:
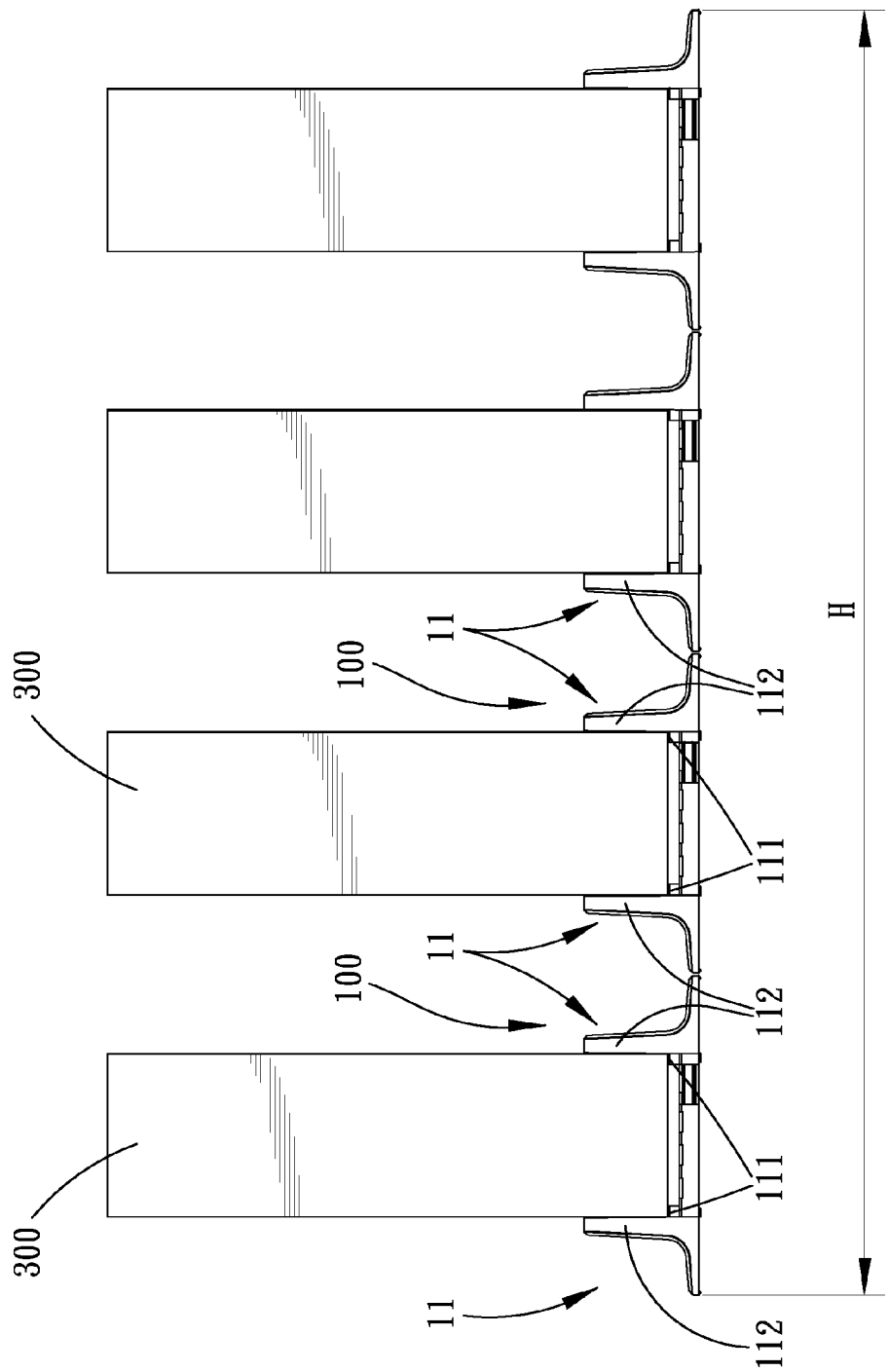
FIG. 4 is a schematic front view of FIG. 3.
Figure 14:
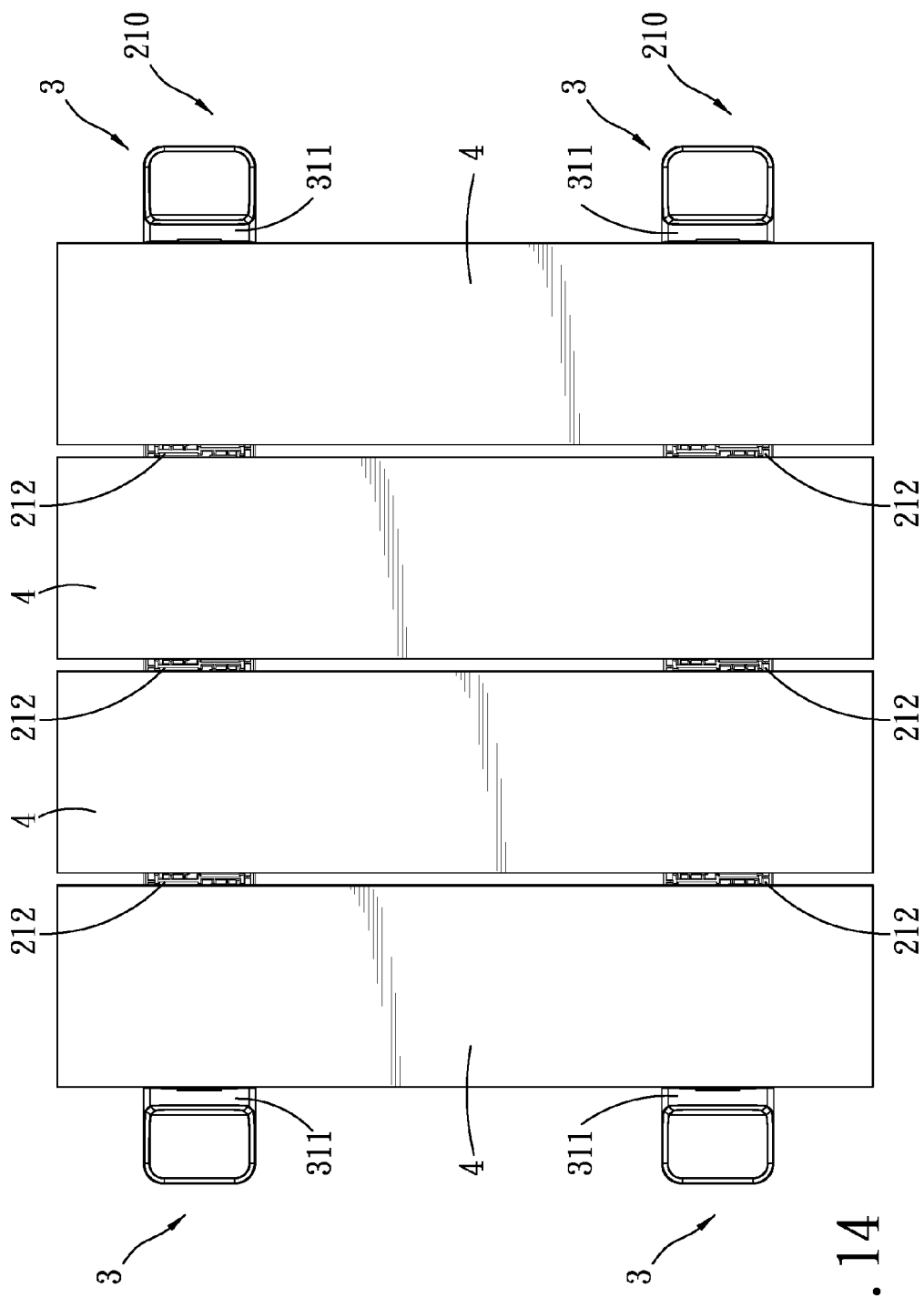
FIG. 14 is a schematic top view of the second embodiment when used to support articles.
Figure 15:
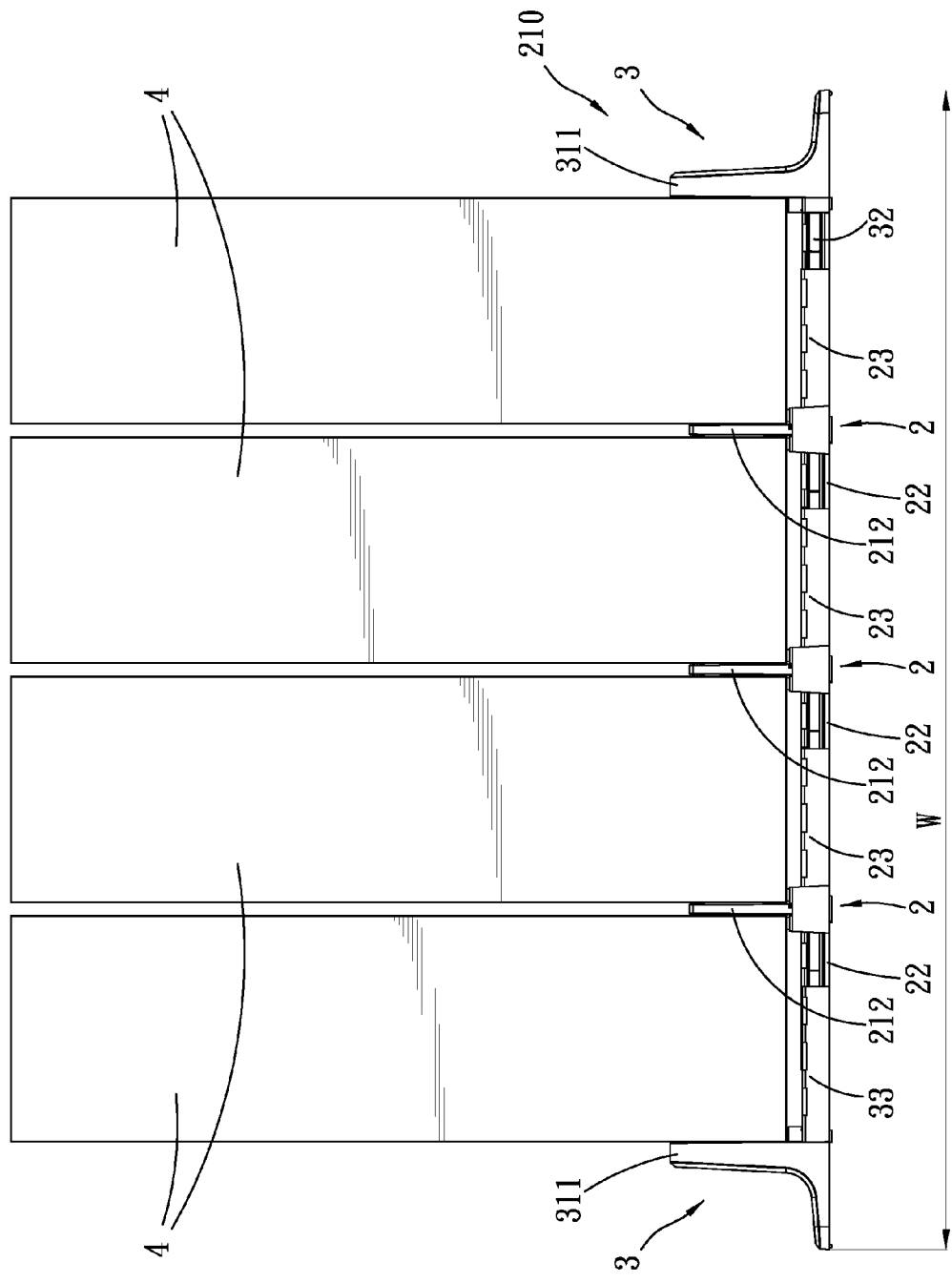
FIG. 15 is a schematic front view of the second embodiment when used to support articles.
Figure 16:
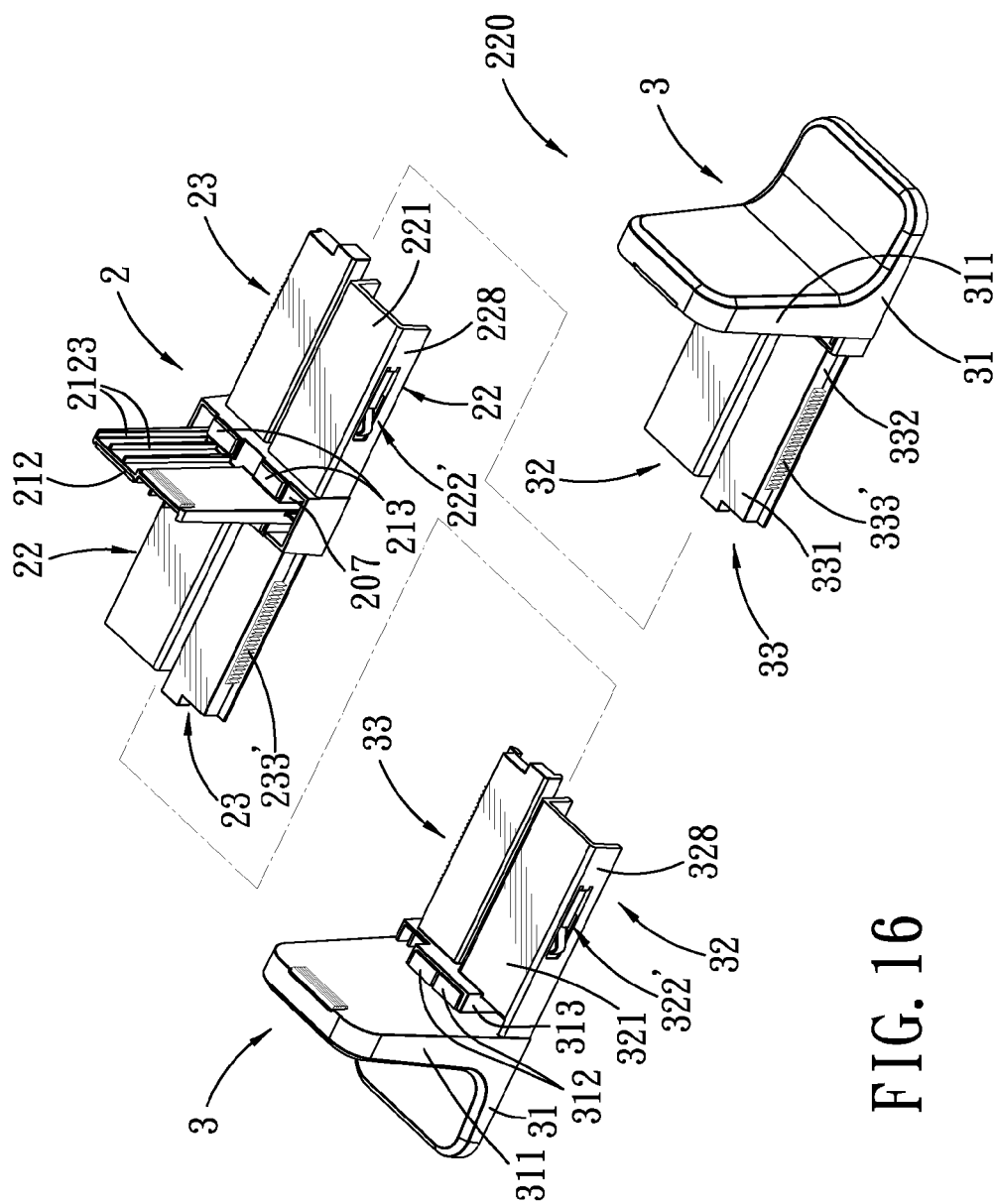
FIG. 16 is an exploded perspective view of the third embodiment of a modular support device according to the disclosure.
Figure 17:
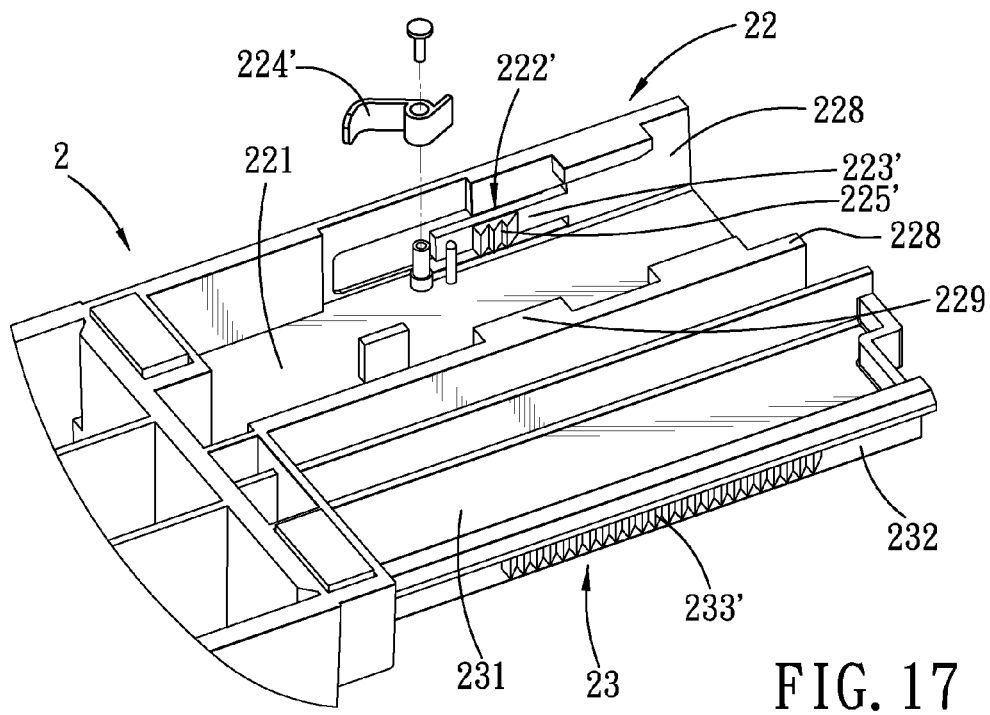
FIG. 17 is a fragmentary enlarged view of a base of the third embodiment.
Figure 18:
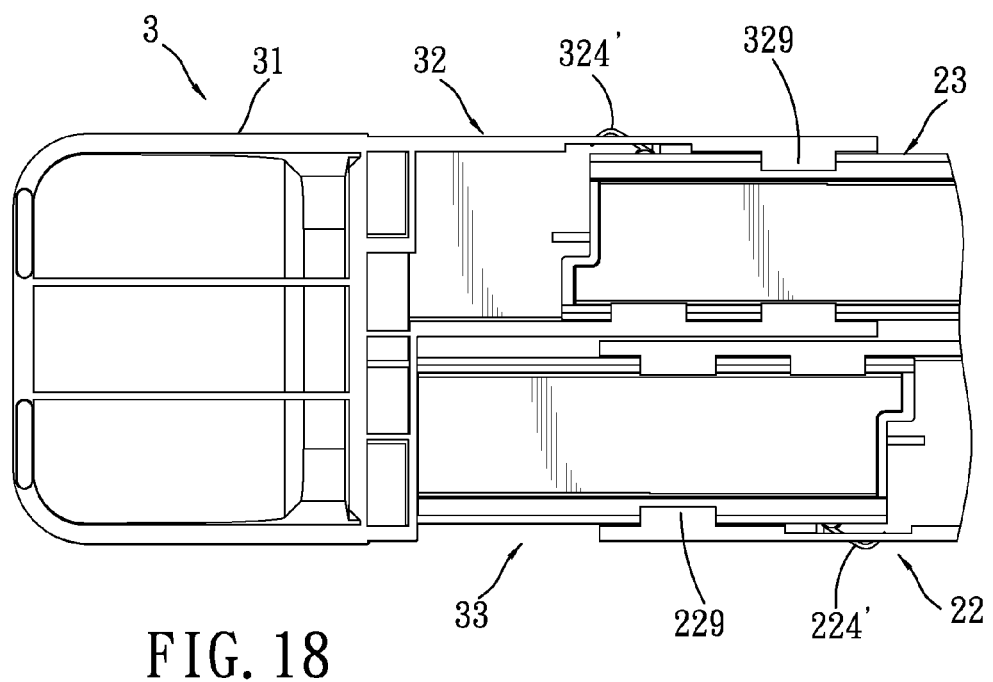
FIG. 18 is a fragmentary schematic bottom view of the third embodiment.
Figure 19:
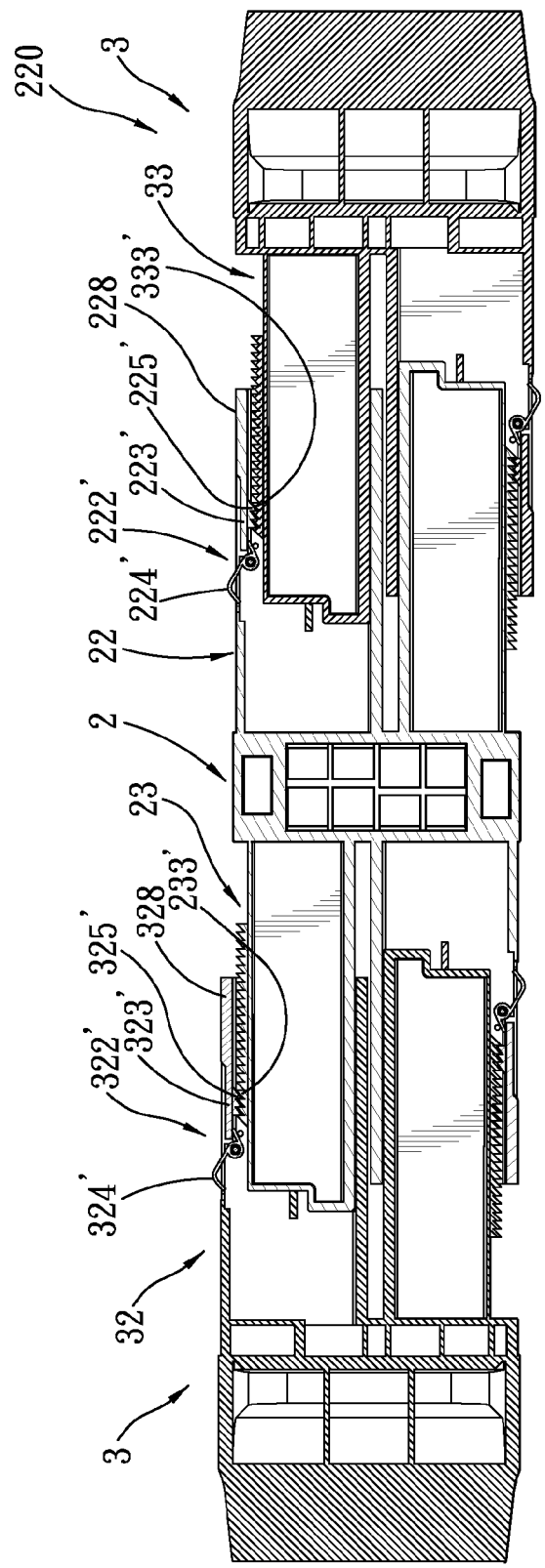
FIG. 19 is a sectional view of the third embodiment.

With reference to FIGS. 14 and 15, in this embodiment, under the condition that the number of the articles 4 is the same as the number of the computer devices 300 (see FIG. 4) of the abovementioned prior art, due to the configuration of the inner bases 2, the combined width (W) occupied by the articles 4 and the modular support device 210 in use is smaller than the width (H) (see FIG. 4). The space taken up thereby is also reduced. Furthermore, although the inner bases 2 are exemplified as three in number in this embodiment, the number of the inner bases 2 should not be limited thereto in other embodiments of the disclosure. The number of the inner bases 2 may be varied depending on the number of the articles 4 to be supported. In addition, if the modular support device 210 dispenses with the two outer bases 3, the plurality of interconnected inner bases 2 will still be able to support the articles 4.

Referring to FIGS. 16 to 19, a modular support device 220 according to the third embodiment of the disclosure is shown to be similar to the first embodiment. The difference between the first and third embodiments resides in the structure of the first and second slidable connecting members 22, 23 of the inner base 2 and the slidable connecting members 32, 33 of the outer bases 3.

In this embodiment, each of the first slidable connecting members 22 of the inner base 2 has two sidewalls 228 extending downwardly from two opposite sides of the top wall 221, and a plurality of flanged portions 229 provided on bottom ends of the sidewalls 228 to abut against a bottom end of the slidable connecting member 33 of the corresponding outer base 3. One end of the connecting portion 223' of the resilient arm 222' of the first slidable connecting member 22 is connected to an outer one of the sidewalls 228. The positioning teeth 225' project from an inner face of the connecting portion 223'. The press portion 224' is connected pivotally to a bottom face of the top wall 221 and is accessible from the outer one of the sidewalls 228 for manipulation purposes. The positioning grooves 233' in each of the second slidable connecting members 23 of the inner base 2 are formed in an outer surface of an outer one of the side plates 232.

The slidable connecting member 32 of each of the outer bases 3 is identical to the first slidable connecting members 22 of the inner base 2 in structure, and is slidably connectible with the corresponding second slidable connecting member 23 of the inner base 2. The slidable connecting member 32 has two sidewalls 328 extending downwardly from two opposite sides of the top wall 321. One end of the connecting portion 323' of the resilient arm 322' of the slidable connecting member 32 is connected to an outer one of the sidewalls 328. Flanged portions 329 of the slidable connecting member 32 are provided on the bottom ends of the sidewalls 328 and abut against a bottom end of the corresponding second slidable connecting member 23. The positioning teeth 325' project from the inner face of the connecting portion 323' and engage the positioning grooves 233' in the corresponding second slidable connecting member 23. The press portion 324' is connected pivotally to the bottom face of the top wall 321 and is accessible from the outer one of the sidewalls 328 for manipulation purposes. The slidable connecting member 33 of each of the outer bases 3 is identical to the second slidable connecting members 23 of the inner base 2 in structure, and is slidably connectible with the corresponding first slidable connecting member 22 of the inner base 2. The positioning grooves 333' in the slidable connecting member 33 of each outer base 3 are formed on an outer surface of an outer one of the side plates 332 for engaging the positioning teeth 225' of the corresponding first slidable connecting member 22 of the inner base 2.

Pushing each of the outer bases 3 toward the inner base 2 shortens the distance between the upstanding limiting member 311 of each outer base 3 and the upstanding plate member 212 of the inner base 2. In addition, manipulating the press portions 224', 324' of the resilient arms 222', 322' of the slidable connecting members 22, 32 simultaneously causes the press portions 224', 324' to push the connecting portions 223', 323' to displace outwardly. When the positioning teeth 225', 325' of the resilient arms 222', 322 are disengaged from the positioning grooves 333', 233' in the slidable connecting members 33, 23, each of the outer bases 3 can be pulled outwardly away from the inner base 2 to increase the distance between the upstanding limiting member 311 of each outer base 3 and the upstanding plate member 212 of the inner base 2.

In sum, because of the configuration of the inner base 2, the modular support device 200, 210, 220 according to each embodiment provides an expansion mechanism. The modular support device 200, 210, 220 may include a variable number of the inner bases 2 depending on the number of the articles 4 to be supported, without needing to increase the number of the outer bases 3 with the number of the articles 4 to be supported. Thus, the combined space and width occupied by the modular support device 200, 210, 220 and the articles 4 in use can be reduced, and the overall manufacturing cost of the modular support device 200, 210, 220 can be minimized.

While the disclosure has been described in connection with what are considered the most practical and embodiments, it is understood that this disclosure is not limited to the disclosed embodiments but is intended to cover various arrangements included within the spirit and scope of the broadest interpretation so as to encompass all such modifications and equivalent arrangements. In addition, it should be appreciated that any of the embodiments of this disclosure or any of the claims as appended hereto does not necessarily have to achieve all of the objects, advantages or features disclosed herein. Moreover, the title of the disclosure and the abstract of the disclosure are provided herein to allow a searcher to quickly ascertain the subject matter of the technical disclosure of any patent issued on this application, and should not be relied upon to limit the scope of protection sought for this disclosure.

We claim:

1. A modular support device adapted to support a plurality of articles, said modular support device comprising:
   a plurality of interconnected inner bases, each of said inner bases including an upstanding plate member, first and second slidable connecting members extending transversely and respectively in opposite directions on two opposite sides of said upstanding plate member, and two first support members that are disposed on two opposite sides of said upstanding plate member and that have support faces at a level higher than that of said first and second slidable connecting members, each of said first support members being disposed between said upstanding plate member and one of said first and second slidable connecting members, said first slidable connecting member of one of said inner bases in each adjacent pair of said inner bases being connectible to said second slidable connecting member of the other of said inner bases in the respective adjacent pair of said inner bases;
   said first and second slidable connecting members of said inner bases in each adjacent pair being slidable relative to each other to adjust a distance between said upstanding plate members of said inner bases;
   each of said first support members of one of said inner bases cooperating with one of said first support members of the other of said inner bases for supporting one of the articles on said support faces thereof; and
   said upstanding date member of one of said inner bases in each adjacent pair of said inner bases cooperating with said upstanding plate member of the other of said inner bases in the respective adjacent pair of said inner bases to sandwich therebetween one of the articles;
   wherein each of said inner bases further includes a hollow base portion that surrounds a lower part of said upstanding plate member, said hollow base portion including two opposite first walls respectively facing and spaced apart from said opposite sides of said upstanding plate member, two opposite second walls interconnecting said first walls, and two connecting webs respectively connecting said second walls to said lower part of said upstanding plate member, each of said first support members being connected to one of said opposite sides of said upstanding plate member and one of said first walls.

2. The modular support device of claim 1, wherein said inner bases are detachably connected to each other.

3. The modular support device of claim 1, wherein said second slidable connecting member of each of said inner bases has a side plate and a plurality of transversely extending parallel positioning grooves formed in an outer surface of said side plate, and said first slidable connecting member of each of said inner bases has a resilient arm which includes a plurality of positioning teeth for engaging selectively said positioning grooves.

4. The modular support device according to claim 3, wherein said first slidable connecting member of each of said inner bases has a top wall, a sidewall connected to one side of said top wall, and a plurality of flanged portions for abutting against a bottom end of said second slidable connecting member of the respective one of said inner bases, and a press portion pivotally connected to a bottom face of said top wall and accessible from said sidewall, said resilient arm including a connecting portion having one end connected to said sidewall, said positioning teeth projecting from an inner side face of said connecting portion, said press portion being capable of being manipulated to bring said connecting portion to move therewith so as to disengage said positioning teeth of said resilient arm from said positioning grooves.

5. The modular support device according to claim 4, wherein each of said inner bases includes two said first slidable connecting members and two said second slidable connecting members, one of said first slidable connecting members and one of said second slidable connecting members being disposed side by side and extending transversely from one of said first walls of said hollow base portion, the other one of said first slidable connecting members and the other one of said second slidable connecting members being disposed side by side and extending transversely from the other one of said first walls of said hollow base portion, said one of said first slidable connecting members and the other one of said second slidable connecting members being arranged along a straight line, the other one of said first slidable connecting members and said one of said second slidable connecting members being arranged along another straight line.

6. The modular support device of claim 1, wherein said second slidable connecting member of each of said inner bases has a side plate and a plurality of transversely extending parallel positioning grooves firmed in an outer surface of said side plate, and said first slidable connecting member of each of said inner bases has a resilient arm which includes a plurality of positioning teeth for engaging selectively said positioning grooves.

7. The modular support device according to claim 6, wherein said first slidable connecting member of each of said inner bases has a top wall, a sidewall connected to one side of said top wall, a plurality of flanged portions for abutting against a bottom end of said second slidable connecting member of the respective one of said inner bases, and a press portion pivotally connected to a bottom face of said top wall and accessible from said sidewall, said resilient arm including a connecting portion having one end connected to said sidewall, said positioning teeth projecting from an inner side face of said connecting portion, said press portion being capable of being manipulated to bring said connecting portion to move therewith so as to disengage said positioning teeth of said resilient arm from said positioning grooves.

8. The modular support device according to claim 7, wherein each of said inner bases includes two said first slidable connecting members and two said second slidable connecting members, one of said first slidable connecting members and one of said second slidable connecting members being disposed side by side and extending transversely from one of said first walls of said hollow base portion, the other one of said first slidable connecting members and the other one of said second slidable connecting members being disposed side by side and extending transversely from the other one of said first walls of said hollow base portion, said one of said first slidable connecting members and the other one of said second slidable connecting members being arranged along a straight line, the other one of said first slidable connecting members and said one of said second slidable connecting members being arranged along another straight line.

9. The modular support device according to claim 1, further comprising two outer bases, said inner bases being disposed between said outer bases, each of said outer bases including an upstanding limiting member, a slidable connecting member extending transversely from said upstanding limiting member, and a second support member that is disposed between said upstanding limiting member and said slidable connecting member of a corresponding one of said outer bases and that has a support face at a level higher than that of said slidable connecting member of the corresponding one of said outer bases, said slidable connecting member of each of said outer bases being slidably connectible with one of said first and second slidable connecting members of the corresponding one of said inner bases.

10. The modular support device of claim 9, wherein said second slidable connecting member of each of said inner bases has a side plate and a plurality of transversely extending parallel positioning grooves formed in an outer surface of said side plate, and said first slidable connecting member of each of said inner bases has a resilient arm which includes a plurality of positioning teeth for engaging selectively said positioning grooves.

11. The modular support device according to claim 10, wherein said first slidable connecting member of each of said inner bases has a top wall, a sidewall connected to one side of said top wall, a plurality of flanged portions for abutting against a bottom end of said second slidable connecting member of the respective one of said inner bases, and a press portion pivotally connected to a bottom face of said top wall and accessible from said sidewall, said resilient arm including a connecting portion having one end connected to said sidewall, said positioning teeth projecting from an inner side face of said connecting portion, said press portion being capable of being manipulated to bring said connecting portion to move therewith so as to disengage said positioning teeth of said resilient arm from said positioning grooves.

12. The modular support device according to claim 11, wherein each of said inner bases includes two said first slidable connecting members and two said second slidable connecting members, one of said first slidable connecting members and one of said second slidable connecting members being disposed side by side and extending transversely from one of said first walls of said hollow base portion, the other one of said first slidable connecting members and the other one of said second slidable connecting members being disposed side by side and extending transversely from the other one of said first walls of said hollow base portion, said one of said first slidable connecting members and the other one of said second slidable connecting members being arranged along a straight line, the other one of said first slidable connecting members and said one of said second slidable connecting members being arranged along another straight line.

13. The modular support device according to claim 1, wherein said upstanding plate member includes a plurality of spaced-apart ribs projecting transversely from at least one of said opposite sides of said upstanding plate member.

14. A modular support device adapted to support an article, comprising:
two spaced-apart outer bases each including an upstanding limiting member, and a slidable connecting member extending transversely from said upstanding limiting member; and
an inner base disposed between said outer bases and including an upstanding plate member having two opposite sides respectively facing said outer bases, a hollow base portion that surrounds a lower part of said upstanding plate member, and first and second slidable connecting members extending respectively in opposite directions from said hollow base portion;

said hollow base portion including two opposite first walls respectively facing and spaced apart from said opposite sides of said upstanding plate member, two opposite second walls interconnecting said first walls, two connecting webs respectively connecting said second walls to said lower part of said upstanding plate member, and two first support members each of which is connected to one of said opposite sides of said upstanding plate member and one of said first walls and has a support face that faces upwardly and that is disposed at a level higher than that of said first and second slidable connecting members;

said slidable connecting member of each of said outer bases being slidably connectible with one of said first and second slidable connecting members of said inner base to adjust a distance between said upstanding limiting member of each of said outer bases and said upstanding plate member of said inner base; and said upstanding limiting member of each of said outer bases cooperating with said upstanding plate member of said inner base for sandwiching the article therebetween.

15. The modular support device of claim 14, wherein each of said outer bases further includes a second support member that is disposed between said upstanding limiting member and said slidable connecting member of a respective one of said outer bases and that has a support face at a level higher than that of said slidable connecting member of the respective one of said outer bases, said second support member of each of said outer bases cooperating with one of said first support members of said inner base for supporting the article on said support faces.

16. The modular support device according to claim 15, wherein said upstanding plate member includes a plurality of spaced-apart ribs projecting transversely from at least one of said opposite sides of said upstanding plate member.

17. The modular support device of claim 14, wherein said second slidable connecting member of each of said inner bases has a side plate and a plurality of transversely extending parallel positioning grooves formed in an outer surface of said side plate, and said first slidable connecting member of each of said inner bases has a resilient arm which includes a plurality of positioning teeth for engaging selectively said positioning grooves.

18. The modular support device according to claim 17, wherein said first slidable connecting member of each of said inner bases has a top wall, a sidewall connected to one side of said top wall, and a plurality of flanged portions for abutting against a bottom end of said second slidable connecting member of the respective one of said inner bases, and a press portion pivotally connected to a bottom face of said top wall and accessible from said sidewall, said resilient arm including a connecting portion having one end connected to said sidewall, said positioning teeth projecting from an inner side face of said connecting portion, said press portion being capable of being manipulated to bring said connecting portion to move therewith so as to disengage said positioning teeth of said resilient arm from said positioning grooves.

19. The modular support device according to claim 18, wherein each of said inner bases includes two said first slidable connecting members and two said second slidable connecting members, one of said first slidable connecting members and one of said second slidable connecting members being disposed side by side and extending transversely from one of said first walls of said hollow base portion, the other one of said first slidable connecting members and the other one of said second slidable connecting members being disposed side by side and extending transversely from the other one of said first walls of said hollow base portion, said one of said first slidable connecting members and the other one of said second slidable connecting members being arranged along a straight line, the other one of said first slidable connecting members and said one of said second slidable connecting members being arranged along another straight line.

* * * * *